(12) United States Patent
Null et al.

(10) Patent No.: US 6,888,323 B1
(45) Date of Patent: May 3, 2005

(54) LIGHT MANAGEMENT SYSTEM DEVICE AND METHOD

(75) Inventors: Jonathan Null, San Jose, CA (US); Melissa Lynn Smith, Burlingame, CA (US); TJ Beyer, Sunnyvale, CA (US)

(73) Assignee: The Watt Stopper, Inc., Santa Clara, CA (US)

( * ) Notice: Subject to any disclaimer, the term of this patent is extended or adjusted under 35 U.S.C. 154(b) by 0 days.

(21) Appl. No.: 10/255,659

(22) Filed: Sep. 25, 2002

(51) Int. Cl.[7] .................................................. G05F 1/00
(52) U.S. Cl. ...................... 315/294; 315/295; 315/308; 315/291; 315/219; 315/307; 315/361; 315/158
(58) Field of Search ................................ 315/294, 291, 315/219, 308, 307, 159, 361, 295, 158, 360, 154, 306, 149, 156; 364/140, 143, 141; 340/573.1, 565, 541, 511, 521; 700/28, 54; 250/342

(56) References Cited

U.S. PATENT DOCUMENTS

| | | | |
|---|---|---|---|
| 3,912,866 A | 10/1975 | Fox .............................. 179/1 E |
| 3,993,569 A | 11/1976 | Zinsmeyer et al. .......... 250/209 |
| 4,021,679 A | 5/1977 | Bolle et al. .................. 307/117 |
| 4,093,943 A | 6/1978 | Knight ......................... 340/220 |
| 4,107,659 A | 8/1978 | Massa .......................... 340/552 |
| 4,233,545 A | 11/1980 | Webster et al. ........ 250/214 AL |
| 4,330,706 A | 5/1982 | Lawenhaupt .......... 250/214 AL |
| 4,458,170 A | 7/1984 | Takayama et al. ........... 310/322 |
| 4,607,186 A | 8/1986 | Takayama et al. ........... 310/324 |
| 4,628,496 A | 12/1986 | Lee ............................... 367/93 |
| 4,695,769 A | 9/1987 | Schweickardt ............... 315/158 |
| 4,751,623 A | 6/1988 | Gaines et al. ................ 362/276 |
| 4,757,430 A | 7/1988 | Dubak et al. ................ 362/100 |
| 4,820,938 A | 4/1989 | Mix et al. .................... 307/117 |
| 4,914,859 A | 4/1990 | Gionet et al. .................... 49/25 |
| 5,015,994 A | 5/1991 | Hoberman et al. .......... 340/567 |
| 5,185,728 A | 2/1993 | Gilchrist ....................... 367/163 |
| 5,189,393 A | 2/1993 | Hu ............................... 340/522 |
| 5,251,188 A | 10/1993 | Parsons et al. .............. 367/140 |
| 5,307,051 A | 4/1994 | Sedlmayr ..................... 340/573 |
| 5,386,210 A | * 1/1995 | Lee .............................. 340/567 |
| 5,442,177 A | * 8/1995 | Boulos et al. ............... 250/342 |
| 5,489,827 A | 2/1996 | Xia .............................. 315/294 |
| 5,495,402 A | 2/1996 | Houssian ..................... 362/226 |
| 5,495,766 A | 3/1996 | Kota et al. ..................... 73/652 |
| 5,638,824 A | 6/1997 | Summers ..................... 128/721 |
| 5,640,143 A | 6/1997 | Myron et al. ................ 340/541 |
| 5,652,567 A | 7/1997 | Traxler ........................ 340/552 |

(Continued)

OTHER PUBLICATIONS

Vishay, Vishay Telefunken, "Physics of Optoelectronic Devices Light–Emitting Diodes,"Dec. 1999, pp. 1–7.
Vishay, Vishay Telefunken, "Measuring Technique General," Dec. 1999, pp. 1–9.

(Continued)

*Primary Examiner*—Hoanganh Le
*Assistant Examiner*—Chuc Tran
(74) *Attorney, Agent, or Firm*—Haverstock & Owens LLP (57) ABSTRACT

A light management system for controlling a load circuit is disclosed. The system preferably comprises a switch unit with a momentary switch for manually controlling the load circuit, a night light to provide low-level or reduced room lighting from the switch unit and a motion sensor for sensing motion from the switch unit. The motion sensor is configured to automatically control the load circuit and/or the night light based on detected motion. In a preferred embodiment of the invention, the load circuit operates a room lighting system, the light unit comprises light emitting diodes to provide the low-level light. The switch unit is preferably programmable to customized modes of operation to suit a wide range of applications. In yet further embodiments of the invention, the system comprises a light sensor for controlling the load circuit or the night light in response to a level of detected room lighting.

28 Claims, 6 Drawing Sheets

U.S. PATENT DOCUMENTS

| | | | | |
|---|---|---|---|---|
| 5,668,446 A | * | 9/1997 | Baker | 315/294 |
| 5,699,243 A | * | 12/1997 | Eckel et al. | 700/17 |
| 5,701,058 A | | 12/1997 | Roth | 315/158 |
| 5,713,655 A | | 2/1998 | Blackman | 362/95 |
| D393,912 S | | 4/1998 | Yuen | D26/26 |
| 5,763,872 A | | 6/1998 | Ness | 250/214 AL |
| 5,867,099 A | * | 2/1999 | Keeter | 340/567 |
| D409,317 S | | 5/1999 | Yuen | D26/26 |
| 5,932,861 A | | 8/1999 | Iwaguchi et al. | 235/455 |
| 5,946,209 A | * | 8/1999 | Eckel et al. | 700/14 |
| 5,984,513 A | * | 11/1999 | Baldwin | 700/286 |
| 6,051,787 A | | 4/2000 | Rintz | 174/66 |
| D425,222 S | | 5/2000 | Yuen | D26/26 |
| D425,638 S | | 5/2000 | Yuen | D26/26 |
| 6,084,231 A | | 7/2000 | Popat | 250/214 AL |
| 6,087,588 A | | 7/2000 | Soules | 174/66 |
| 6,087,760 A | | 7/2000 | Yamaguchi et al. | 310/334 |
| D431,660 S | | 10/2000 | Yuen | D26/26 |
| 6,132,057 A | | 10/2000 | Williams | 362/100 |
| 6,151,529 A | * | 11/2000 | Batko | 700/28 |
| 6,172,301 B1 | | 1/2001 | Goodsell | 174/66 |
| RE37,135 E | | 4/2001 | Elwell | 315/154 |
| 6,337,541 B1 | | 1/2002 | Dickie et al. | 315/169.3 |
| 6,343,134 B1 | | 1/2002 | Czerwinski | 381/342 |
| 6,390,647 B1 | | 5/2002 | Shaefer | 362/276 |
| 6,466,826 B1 | * | 10/2002 | Nishihira et al. | 700/17 |
| 6,566,882 B2 | * | 5/2003 | Baldwin et al. | 324/418 |
| 6,583,573 B2 | * | 6/2003 | Bierman | 315/149 |
| 6,693,527 B2 | * | 2/2004 | Bone | 340/500 |

OTHER PUBLICATIONS

Asian Technology Information Program (ATIP), "Blue LED's: Breakthroughs and Implications," ATIP Report ATIP95.59, Aug. 27, 1995, See www.cs.arizona.edu/japan/atip/public/atip.reports.95/atip95.59r.html.

Energy User News, "The Coming Revolution in Lighting Practice," by Sam Berman, Oct. 2000, pp. 24–26.

IESNA Paper #59, "Characterizing Daylight Photosensor System Performance to Help Overcome Market Barriers," by Andrew Bierman et al.

Journal of the Illuminating Engineering Society, "Improving the Performance of Photo–Electrically Controlled Lighting Systems," by Francis Rubinstein et al., Winter 1989, pp. 70–94.

Specifier Reports, "Photosensors—Lightsensing devices that control output from electric lighting systems", National Light Product Information Program, vol. 6, No. 1, Mar. 1998, p. 1 of 20.

"Si Photodiode—S7686", Hamamatsu, pp. 1.

"Si Photodiodes—S6626, S6838", Hamamatsu, pp. 1–2.

"Si Photodiodes—S7160, S7160–01", Hamamatsu, pp. 1–2.

* cited by examiner

|  | Load | Nightlight | Time Delay | Daylight | Function |
|---|---|---|---|---|---|
| Mode 1 | Manual On | Automatic | 1 Hour | N/A | When load is on, nightlight is off |
| --- | Manual On | Automatic | 2 Hour | N/A | When load is on, nightlight is off |
| --- | Manual On | Automatic | 0.5 Hour | N/A | When load is on, nightlight is off |
| --- | Manual On | Automatic | 0.25 Hour | N/A | When load is on, nightlight is off |
| Mode 2 | Automatic On | Automatic | 0.25 Hour | N/A | When load is on, nightlight is off |
| Mode 3 | Manual On | Automatic On | XX Hour(s) | N/A | Nightlight turns on based on occupancy but load is a manual on function, Time delay is same for both |
| Mode 4 | Automatic On | Automatic On | XX Hour(s) | N/A | If ambient light level in room is above a set limit, the load and nightlight are held off until light level falls below limit |
| Mode 5 | Any Combination of above | Any Combination of above | Any Combination of above | Any Combination of above | Any Combination of above |

{ 401 (rows 1-4), 403 (Mode 2), 405 (Mode 3), 407 (Mode 4), 409 (Mode 5) }

LIGHT MANAGEMENT SYSTEM DEVICE AND METHOD

FIELD OF THE INVENTION

The invention relates to light management systems, devices and method. More particularly, the present invention relates to light management systems and devices for and methods of automatically and manually controlling a load circuit with room lights.

BACKGROUND OF THE INVENTION

A number of different light management systems are known. One type of light management system utilizes a motion detector or sensor. In such systems, room lights are turned off, turned on and/or are dimmed according to a detected level of motion within the room.

There is a continual push to reduce energy consumption, because of rising energy costs and negative environmental impacts of energy usage and energy generation. Therefore, there is a need for improved light management systems, devices and methods which help to conserve energy.

SUMMARY OF THE INVENTION

The present invention is directed to a device and system for and method of controlling a load circuit, such as a load circuit coupled to a room light. A system, in accordance with the embodiments of the invention comprises a switch unit for coupling to the load circuit. The switch unit is preferably configured to replace a standard light switch and secure to an electrical receptacle box on a wall.

The switch unit preferably has a manual switch for manually controlling the room light through the load circuit. The manual switch is preferably a momentary switch, which herein describes a touch switch that is depressed to change the operation of the switch unit and then returns to its original position. However, it is understood that any other type of switch for manually controlling the room light through the load circuit, such as a rheostat, a toggle or a flip switch are considered to be within the scope of the present invention. The switch unit also has a light unit, also referred to herein as a night light, for emitting low level room light when the manual switch opens the load circuit to turn the room light off, or when current that is drawn through the load circuit reaches a predetermined value.

In a preferred embodiment of the invention, the switch unit has a motion sensor, wherein the motion sensor is configured to instruct the switch unit to adjust room lighting by adjusting the level of light emitting from the room light, the night light or both, based on a level of detected motion within an area around the switch unit. For example, when no motion is detected by the motion sensor in the area around the switch unit, then the sensor, after a time delay, instructs the switch unit to dim the room light, dim the night light, shut the room light off, shut the night light off or a combination thereof. Likewise, when the motion detector detects motion within the area around the switch unit, then the motion sensor instructs the switch unit to increase the level of room lighting by turning the room light on, turning the night light on, brightening the room light, brightening the night light or a combination thereof.

Preferably, the switch unit has a micro-processor for programming modes of operation, including setting the time delay value for when the room light and/or night light are shut off or dimmed in the absence of detected motion. Preferably, the micro-processor is programable through an internal dip switch, the manual switch or a combination thereof. For example, during the installation of the switch unit, a technician actuates the internal dip switch to place the switch unit in program mode. Then the technician can toggle through options, including automatic operation or manual operation of the room light and automatic or manual operation of the night light. In yet further embodiments, the switch unit is programmable to have the room lights and/or the night light turn on and/or off based on the time of day. For example, the switch unit is programmable to have the night light capabilities only during the hours of 6:00 PM to 6:00 AM.

In a preferred embodiment of the invention, the manual switch of the switch unit is a momentary switch with the night light and the motion detector integrated into the momentary switch. The motion sensor is preferably an infrared motion sensor and the night light preferably comprises light emitting diodes (LEDs). In this preferred embodiment, dimming the night light is accomplished by providing a pulsed current to the LEDs, such that the LEDs shut on and off to give an apparent dimming effect. Alternatively, or in addition to providing a pulsed current, dimming the night light is accomplished the disabling one or more of the light emitting diodes.

In accordance with still further embodiments of the invention, the switch unit has a light detector for measuring a level of room lighting. The light sensor is preferably configured to turn on, turn off, and/or dim the room light and/or the night light based on a level of detected room lighting. For example, if the load circuit is open and the night light is on, when the light sensor detects that there is a sufficient level of room lighting coming from, for example sun light or from lights in adjacent room(s), then the light sensor instructs the switch unit to turn the night light off, turn the room light off, dim the room light or any combination thereof.

DETAILED DESCRIPTION OF THE INVENTION

There are a number of situations where a minimal or a reduced amount of room lighting is preferred. For example, during the night people often prefer to have a night light in a hallway, bathroom or bedroom. To fulfill this need, night lights are often plugged into electrical outlets of hallways, bathrooms or bedrooms.

In hotels, where there is a large number of rooms, conventional plug-in night lights are impractical for several reasons. Since they are not fixed to the wall they tend to get lost, broken or stolen. Even if plug-in night lights could be effectively fixed to the electrical outlets, they are generally not configured to operate on as needed basis and require that occupants turn them on and off. Further, most plug-in night lights do not generate a sufficient amount of low level light to allow occupants to navigate through hotel rooms at night.

Hotel rooms tend to be extremely dark. To maintain a low level of light during the night hours, to allow occupants to navigate through unfamiliar quarters, or merely for comfort reasons, occupants of a hotel room will often leave a bathroom light on all night with the bathroom door ajar by an amount sufficient to provide the desired amount of night light. In a large hotel and where each bathroom light can have a number of incandescent bulbs, such behavior results in a considerable waste of energy and cost to the proprietor.

The current invention is directed to a light management system for adjusting room lighting based on occupation of the room and is especially configured for providing reduced or low level room lighting from a night light. The system of the present invention couples to a load circuit with a room light and operates the room light and the night light in a concerted manner, as described below.

Figure 1:
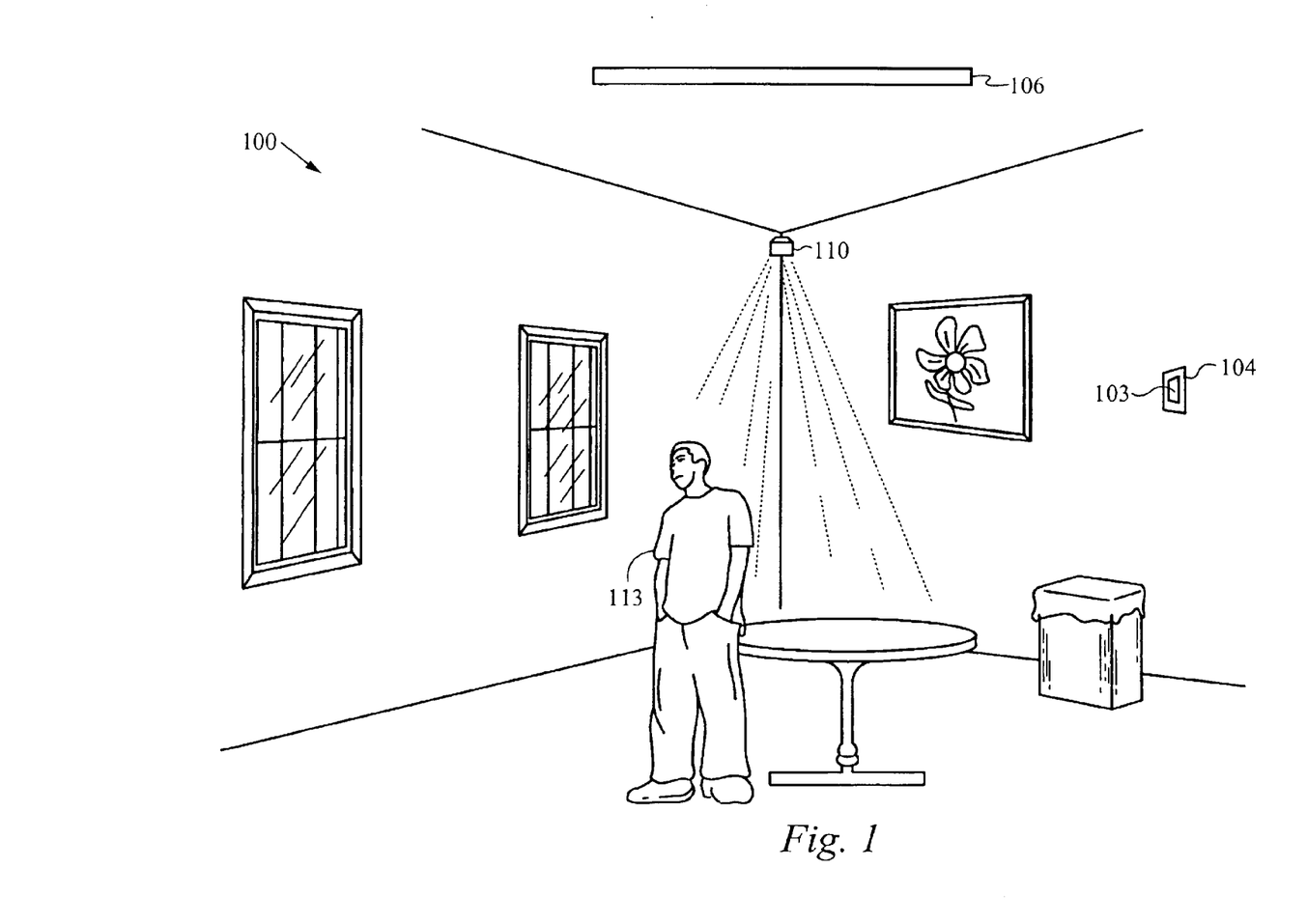
FIG. 1 shows a perspective view of a room with a motion sensor and a manual switch for controlling a room light.

FIG. 1 shows a perspective view of a room 100 with a light management system. The system comprises a sensor 110 for sensing the presence of a person 113 within the room 100. The system 100 also has a switch unit 104 with manual switch 103 for manually turning on and off the room light 106. The sensor 110 is coupled to the room light 106 and is configured to turn on and off and/or dim the room light 106 based on detected occupation of the room.

Figure 2:
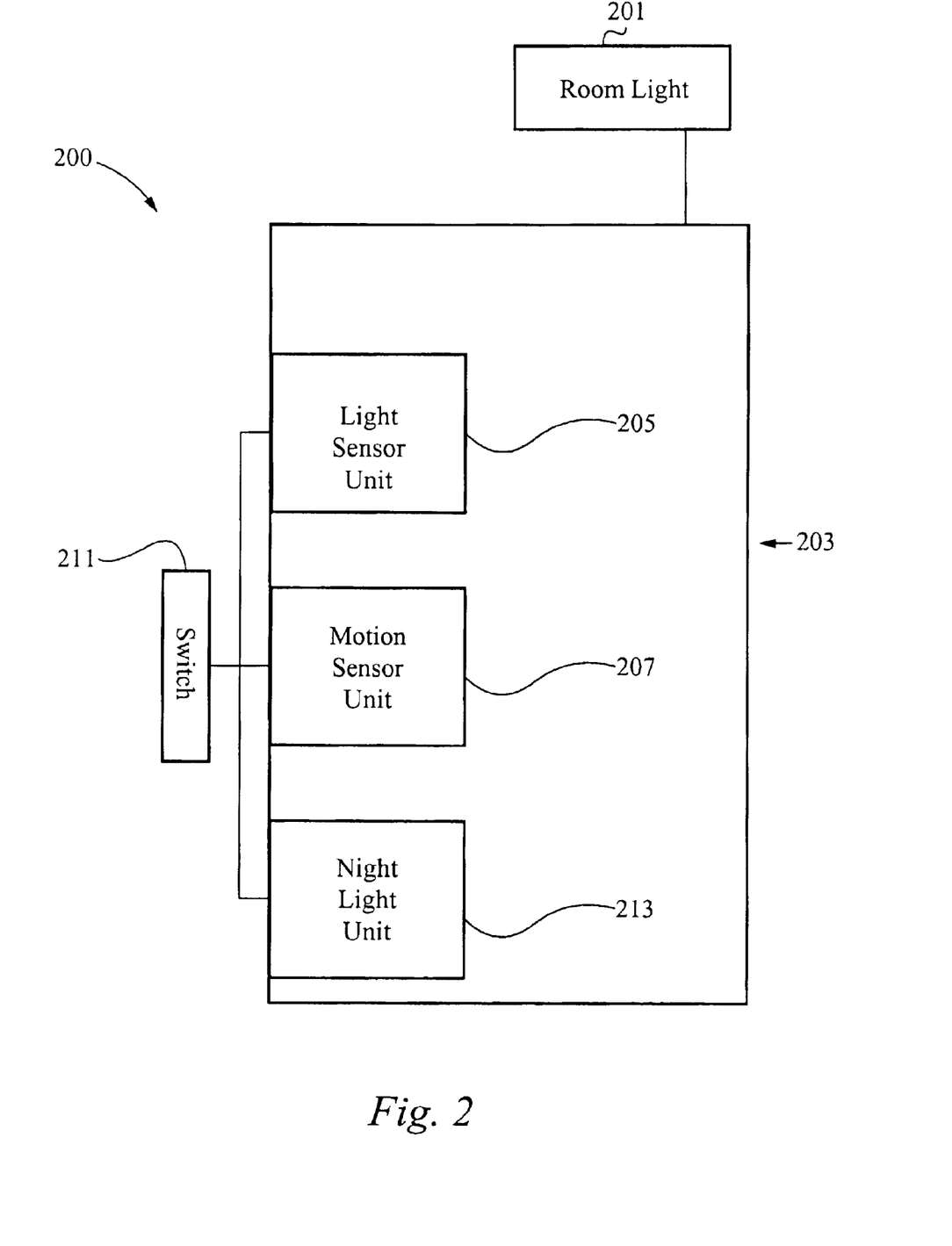
FIG. 2 shows a schematic block diagram of a light management system, in accordance with the embodiments of the invention.

Now referring to FIG. 2, a light management system 200 in accordance with the embodiments of the present invention, preferably comprises a housing unit 203, for coupling to the wall receptacle and a manual wall switch 211 for manually operating a room light 201, such as an overhead light fixture or a wall light fixture. The system 200 preferably further comprises a night light unit 213, such as a night light, configured to provide reduced or low level room lighting when the room light 201 is off. In addition to the manual switch 211 and the night light unit 213, the system 200 preferably comprises a sensor 207 that is configured to operate or adjust room light 210 and/or the night light unit 213 based on a detected occupancy of the room. Preferably, the sensor 207 is a motion sensor configured to operate or adjust the room light 210 and/or the night light unit 213 based on a level of detected motion within the room, or a lack thereof, as explained in detail below.

Still referring to FIG. 2, the system 200, in accordance with further embodiments of the invention, comprises a light sensor unit 205. The light sensor unit 205 is configured to detect a level of room lighting and adjust the room light 201 and/or night light unit 213 based on a level of detected room lighting. The manual switch 211, the night light unit 213, the motion sensor unit 207 and the light sensor unit 205 are integrated to operate collectively in a number of different ways to provide a wide range of modes of operation suitable for a variety of applications. For example, the light sensor unit 205, in accordance with the embodiments of the invention, is configured to override the motion sensor unit 207, such that the room light 210 and/or the night light unit 213 are disabled when there is a sufficient level of room lighting, regardless of whether the room is occupied or not. Accordingly, modes of operation described below are for illustration only and any number of different modes of operation are considered to be within the scope of the present invention.

Figure 3:
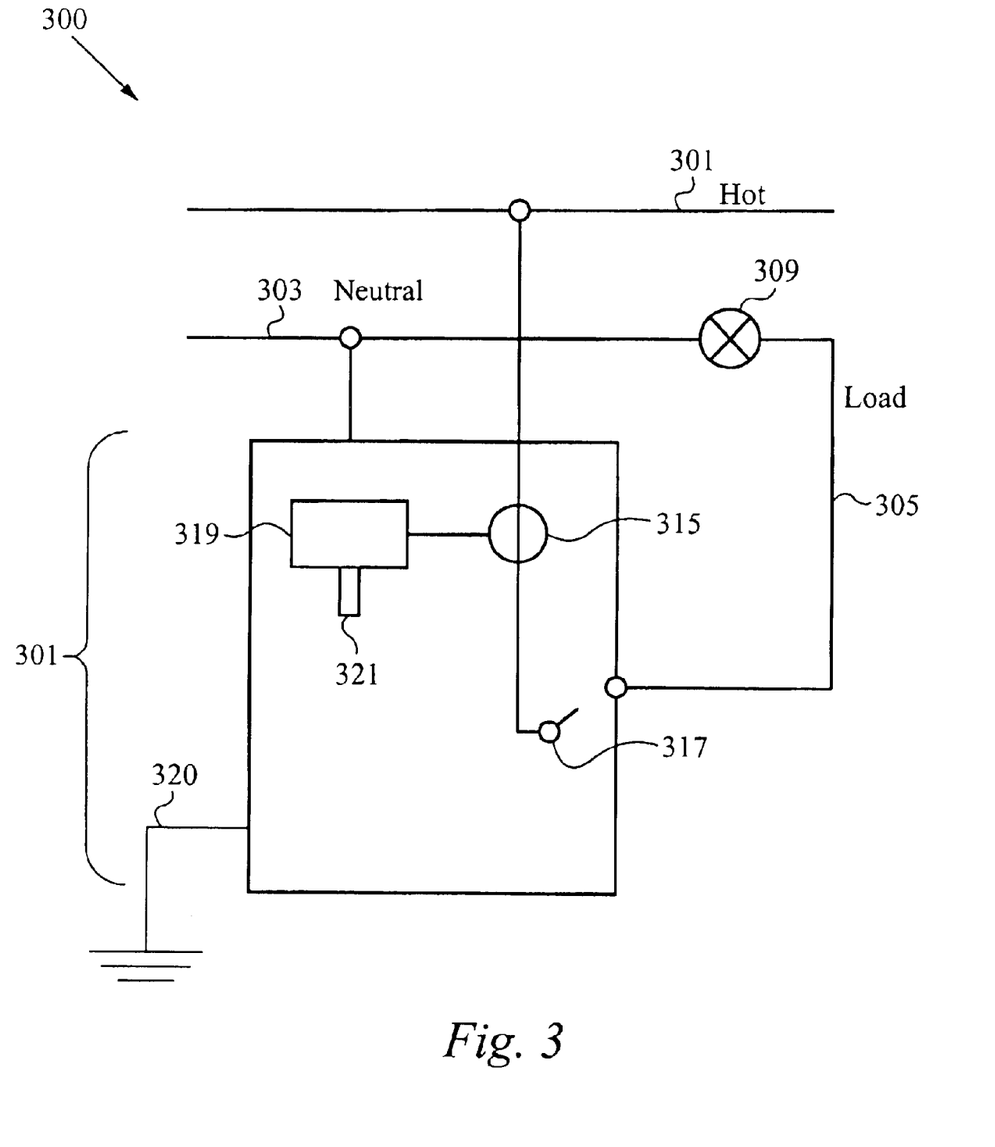
FIG. 3 is a schematic wiring diagram of a light management system, in accordance with the embodiments of the invention.

FIG. 3 shows a schematic wiring diagram of a load circuit 300 with a control system 301, in accordance with the embodiments of the present invention. The control system 301 comprises one or more control units 315 in communication with a circuit switch 317. The control units 315 are configured to open and close the circuit switch 317. Preferably, the control unit 315 includes an infrared motion sensor for detecting motion and for opening and closing the circuit switch 317 based on a level of detected motion. The control unit 315, in accordance with further embodiments of the invention, includes a light sensor, as described above.

The system 301 is coupled to an electrical ground lead 320. The circuit switch 317 is coupled to a neutral lead 302 and a hot lead through the control unit 315, with a load device 309 therebetween, as shown. When the circuit switch 317 is closed current is then drawn through the load device 309 to operate the load device 309. The load device 309 is preferably a light fixture for lighting a room.

Still referring to FIG. 3, the system 301 also preferably has a microprocessor 319 is configured with firmware which allows a user to select modes of operation with a dip switch 321. In accordance with further embodiments of the invention, the micro-processor is coupled to a momentary switch (not shown) which allows the user to select system features within a given mode of operation. For example, the system 310 is configured to allow the user to place the system 301 in program mode by pushing the momentary switch down and holding the momentary switch down for period of time. With the system 301 in program mode, the user programs the light unit (not shown) to shut off in response to ambient light and/or adjusts the level of light emitted by the light unit. When the light unit comprises LEDs, selecting the level of light emitted by the light unit comprises enabling or disabling one or more of the LEDs.

Figure 4:
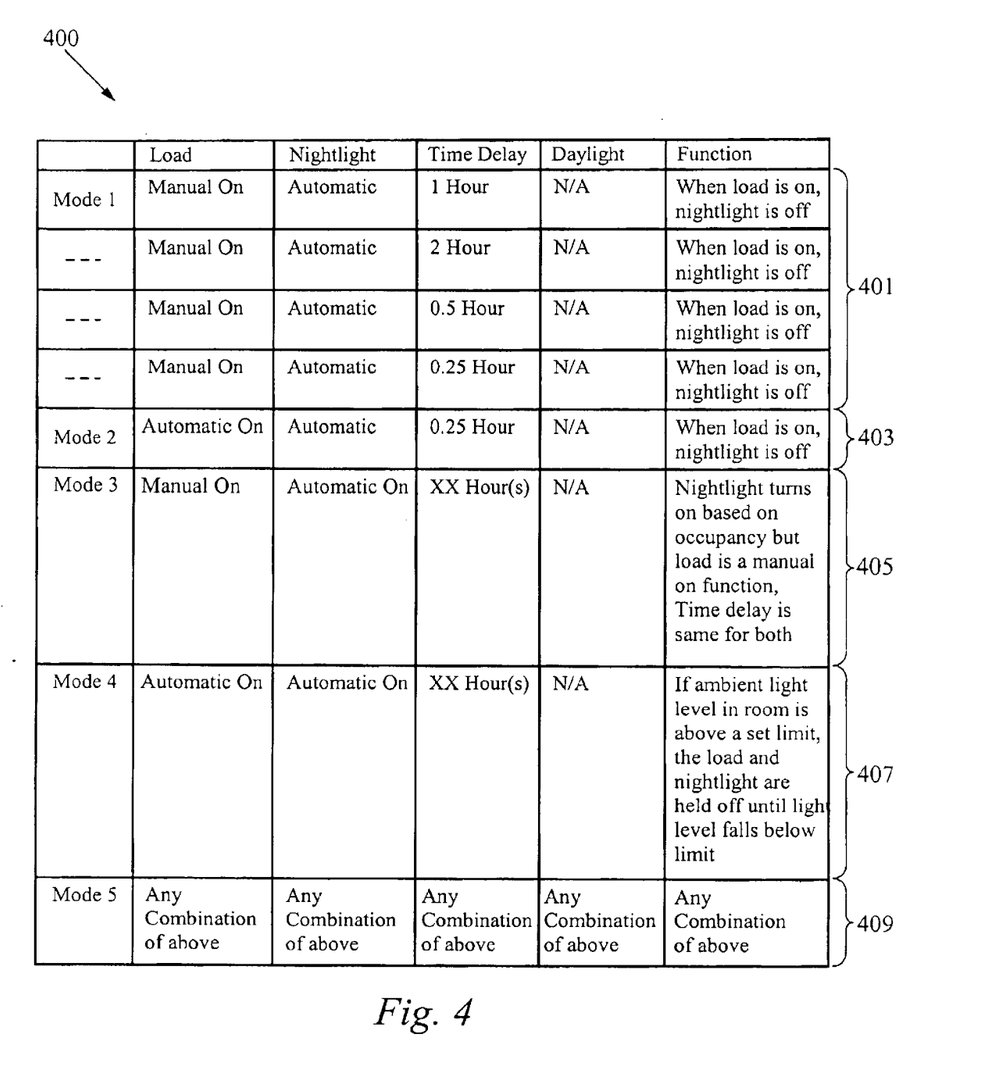
FIG. 4 shows a table of selectable modes of operation for a light management system, in accordance with the embodiments of the invention.
Figure 6:
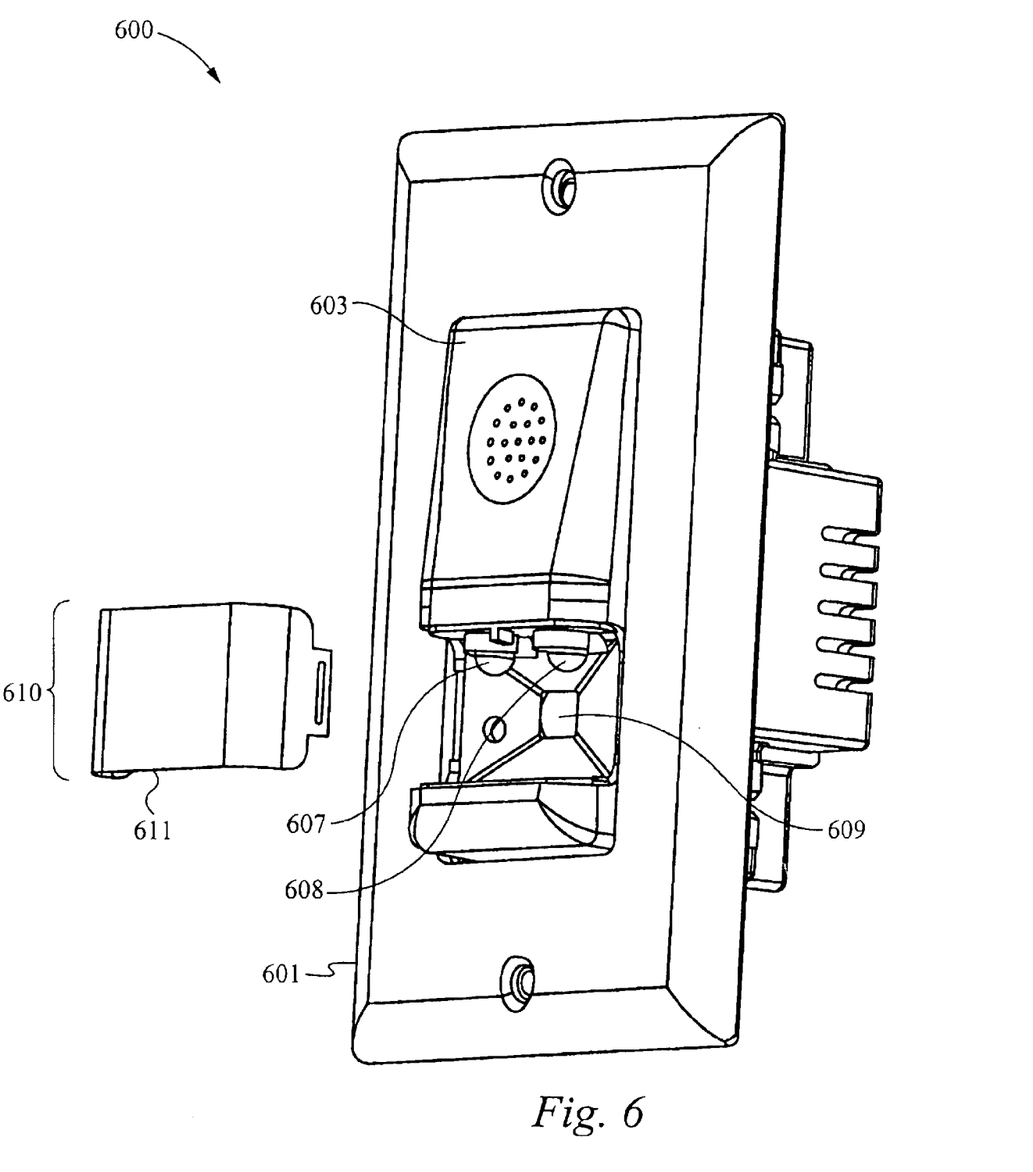
FIG. 6 shows a perspective view of a switch unit with a light unit and motion sensor integrated into a momentary switch, in accordance with a preferred embodiment of the present invention.

FIG. 4 shows a table 400 of modes of operation selectable or programable from the dip switch (FIG. 3) and/or a momentary switch 603 (FIG. 6). In a first mode of operation 401, a load circuit is operated through a manual switch and a night light is shut off when the manual switch closes the load circuit. When the manual switch opens the load circuit, the night light automatically turns on. More importantly, in the event that the load circuit is left closed and a motion sensor does not detect an occupant in the room, then the system will automatically open the load circuit within a prescribed time delay, that is selected at the time of installation or, alternatively, is selectable through the manual switch with the system in program mode, as previously described.

In a second mode of operation 403, the load circuit is configured to automatically close when the sensor unit detects an occupant in the room and automatically shuts the night light off. In event that the load circuit is left closed and a motion sensor does not detect an occupant in the room, then the system will automatically open the load circuit within a prescribed time delay and will simultaneously turn the night light on. In a third mode of operation 405, the load circuit is opened and closed manually through the manual switch. In the event that the load circuit is left closed, and the motion sensor does not detect an occupant in the room, then the system automatically opens the load circuit with a prescribed time delay. In this third mode of operation 405, when the motion sensor detects an occupant in the room, then the system automatically turns the night light on and shuts the night light off after a prescribed time delay when an occupant is no longer detected in the room.

In a fourth mode of operation 407, the system is configured to automatically close the load circuit when the sensor unit senses an occupant in the room and automatically shuts the night light off. In the event that the load circuit is left closed and the motion sensor does not detect an occupant in the room, then the system automatically opens the load circuit within a prescribed time delay and automatically turns the night light on. In addition, a light sensor senses a level of room lighting and the load circuit remains open with the night light off, until the room lighting falls below a selected level and then the system closes the load circuit and/or turns on the night light, as explained above. In yet a fifth mode of operation 409, the system is configured to operate with any combination of the features described for the modes of operation 401, 403, 405, and 407. Also, in accordance with further embodiments of the invention, the system has an internal clock, which allows the system to enable the operation of the night light only during hours of expected darkness. In yet further embodiments of the invention, the system is configured to control a level of current that is drawn through the load circuit, dimming the room light and/or the night light according to the time of day, the level of room lighting, occupation of the room or any combination thereof.

Figure 5:
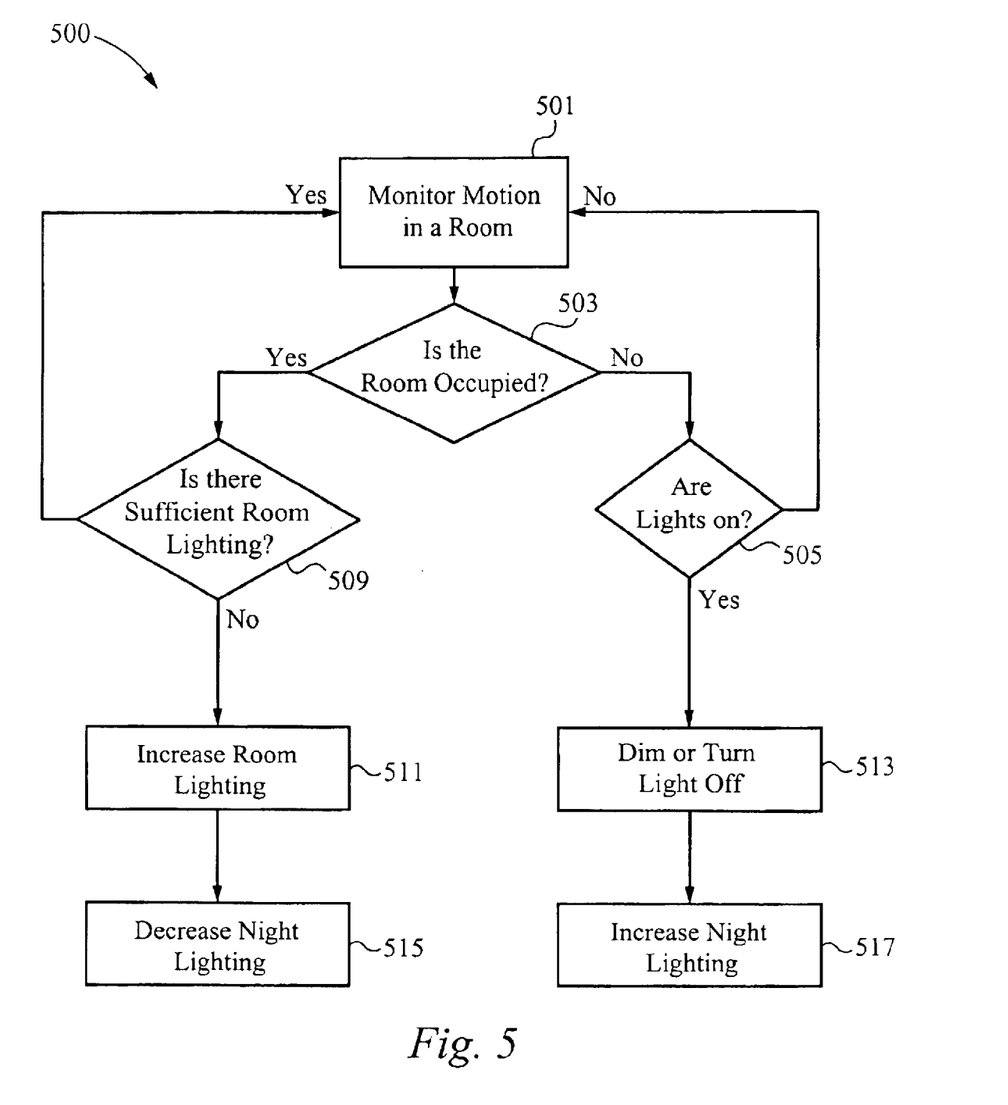
FIG. 5 is a block diagram outlining the steps for controlling room lighting, in accordance with the method of the present invention.

FIG. 5 is a flow chart 500 outlining the steps of a method for managing room lighting, in accordance with the present invention. In the step 501, motion in a room is monitored. Preferably, motion is monitored from a switch unit equipped with an infrared motion sensor for sensing an occupant in the room. However, it will understood by one skilled in the art that occupants in the room can be determined by any number of optical, electrical and mechanical means. While motion is monitored in the step 501, then in the step 503 the system determines whether or not the room is occupied. If in the step 503 the system determines that the room is not occupied, then in the step 505 it is determined if the room light is on. If, in the step 503, the system determines that room light is not on, then the system continues to monitor for motion in the room. If, in the step 505, the system determines that the room light is on, then in the step 513 the room lighting is lowered or reduced by turning off the room light, dimming the room light, turning the night light off, dimming the night light or a combination thereof. Alternatively, or in addition to reducing the level of light emitted from the room light, in the step 517, the level of light emitted from the night light is also increased.

Still referring to FIG. 5, if in the step 503, the system determines that the room is occupied, then in the step 509 the system determines if there is sufficient room lighting. Room lighting, herein, refers to sun light, light from adjacent rooms, light from light fixtures within the room, light from the night light or a combination thereof. A light sensor is preferably configured 5' to sense a level of room lighting and allow the system to determine if the room lighting is sufficient. If in the step 509 the system determines that there is a sufficient level of room lighting, then the system continues to monitor for motion in the room. If however in the step 509, the system determines that there is an insufficient level of room lighting, then in the step 511 the system increases the level of room lighting by increasing the amount of light that is emitted by the room light, the night light of the system or a combination thereof. In accordance with further embodiments of the invention, in the step 509, when making the determination of whether or not there is a sufficient level of room lighting the system takes into account the time of day and specifically whether it is currently during a time of expected darkness. Alternatively, or in addition to increasing the level of light emitted from the room light, in the step 515, the level of light emitted from the night light is also decreased.

FIG. 6 shows a switch unit 600 for coupling to a wall receptacle and coupling to a load circuit with one or more room lights, also referred to as a primary light source. The switch unit 600 has a face cover 601 for coupling to an electrical wall receptacle and a housing for housing electrical components, wire connections and a microprocessor. In accordance with the embodiments of the invention, the switch unit 600 has a night light unit 610 comprising LEDs 607 and 608 for providing secondary light from the switch unit 600. The exact operation of the night light depends on the mode of operation selected, as explained above.

Still referring to FIG. 6, the switch unit 600 also preferably has a motion sensor 609, that preferably comprises an infrared motion sensor. The motion sensor 609 and the night light unit 610 comprising the LEDs 607 and 608 are preferably physically integrated into a momentary switch 603 for manually opening and closing the load circuit. The night light unit 610 also preferably comprises a lens 611 configured to cover the LEDs 607 and 608 and the motion sensor 609, in order to protect the motion sensor 609 and to diffuse light emitted from the LEDs 607 and 608.

The present invention provides for the ability to manage room lighting efficiently. The system of the present invention provides for the ability to manage room lighting from a switch unit that is configured to control room lighting automatically based on occupation of the room, time of day, a level of detected room lighting or combinations thereof.

The system of the present invention is particularly well suited for reducing energy usage for room lighting in high occupancy facilities, such as hotels, motels and the like, wherein occupants are required to sleep in unfamiliar surroundings, require low level room lighting at night and where occupants are not generally considerate of energy conservation measures. Because the system of the present invention is programmable, the system is readily adaptable for a wide variety of different applications including use in residential housing and commercial buildings.

While the present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A switch unit for coupling to a load circuit, the switch unit comprising:
   a. a switch for manually opening and closing the load circuit;
   b. a night light unit integral with the switch unit and configured to emit light output for a selectable duration of time in response to placing the switch in an opened position; and
   c. a motion sensor unit integral with the switch unit and configured to control the light output from the night light unit in response to a level of detected motion from the motion sensor unit.

2. The switch unit of claim 1, wherein the night light unit is configured to reduce a level of light after the duration of time.

3. The switch unit of claim 1, wherein the motion sensor comprises an infrared sensor.

4. The switch unit of claim 1, further comprising a micro-processor for programming the selectable duration of time.

5. The switch unit of claim 4, wherein the switch is a momentary switch.

6. The switch unit of claim 5, wherein the micro-processor is programmable through the momentary switch.

7. The switch unit of claim 1, wherein the night light unit comprises a light emitting diode.

8. The switch unit of claim 1, further comprising a light sensor unit for detecting light and for controlling the light output emitted from the night light unit in response to detected light.

9. The switch unit of claim 1, wherein the switch unit is configured to automatically open the load circuit after a selectable delay of time.

10. A light control unit for electrically coupling to a load circuit with a light, the light control unit comprising:
   a. a switch integral with the light control unit for manually controlling an electrical load through the load circuit;
   b. a night light unit configured to respond to the electrical load, wherein the night light unit emits light from the switch when the load circuit is placed in an opened position; and
   c. a motion sensor unit for automatically controlling the night light unit in response to detected motion, wherein the night light unit and the motion sensor unit are integrated into the switch.

11. The light control unit of claim 10, where the night light unit is configured to emit light when the electrical load corresponds to a predetermined level.

12. The light control unit of claim 11, wherein the night light unit is configured to emit a reduced level of light after a delay of time and in the absence of the detected motion.

13. The light control unit of claim 10, wherein the motion sensor unit instructs the light control unit to automatically adjust the electrical load based on a level of the detected motion.

14. The light control unit of claim 12, further comprising a microprocessor for programming a mode of operation, wherein the mode of operation includes the duration delay of time.

15. The light control unit of claim 10, further comprising a light sensor unit, wherein the night light unit is configured to automatically respond to a detected level of light from the light sensor.

16. A light management system comprising:
   a. means for manually controlling a primary light source to turn on and off, wherein the means for manually controlling the primary light source comprises a switch unit with a switch, wherein the switch unit is configured for coupling to an electrical wall receptacle;
   b. means for providing a secondary light source that emits light from the switch unit when the primary light source is off; and
   c. means for automatically controlling the secondary light source in response to detected motion and detected light levels.

17. The light management system of claim 16, wherein the means for automatically controlling the secondary light source comprises a motion detector unit integrated with the switch unit.

18. The light management system of claim 17, wherein the motion detector unit comprises an infrared motion detector.

19. The light management system of claim 16, wherein the means for 2 providing the secondary light source comprises a light emitting diode.

20. The light management system of claim 19, wherein the light emitting diode is integrated with the switch unit.

21. A method of controlling lighting comprising:
   a. monitoring motion in an area with a motion detector that is integrated with a wall mounted light switch, wherein the light switch is configured to manually turn a primary light source on and off; and
   b. controlling a level of emitted light from a secondary light source integral with the wall mounted light switch in response to a level of motion detected from a motion sensor integral with the wall mounted light switch wherein the secondary light source automatically turns on when the primary light source is manually turned off with the wall mounted light switch.

22. The method of claim 21, wherein controlling the level of emitted light from the secondary light source comprises reducing the intensity of the light emitted from secondary light source after a selected delay of time when the level of motion detected is below a threshold level.

23. The method of claim 21, wherein controlling the secondary light source comprises increasing the intensity of the light emitted from the secondary light source motion is detected.

24. The method of claim 21, further comprising controlling the primary light source in response to at least one of the level of motion detected and a level of light detected in the area.

25. A method of making a wall mounted light controller comprising:
   a. integrating a night light and a motion sensor unit into a momentary light switch; and
   b. coupling the night light and the motion sensor unit and light switch to a microprocessor, wherein the night light is programmed to turn on to emit light and turn off after a programmed delay of time when the light switch is placed in an off position and turned on to emit light when the motion sensor unit detects motion.

26. The method of claim 25, further comprising integrating a light sensor unit into the momentary light switch, wherein the night light is programmed to turn off and on in response to a level of detected light.

27. A switch unit for coupling to a load circuit through a wall receptacle, the switch unit comprising:
   a. a switch for manually opening and closing the load circuit;
   b. a night light unit configured to emit light output for a programmable time when the switch is in an opened position; and
   c. means for controlling a level of the light output from the night light with the switch in the opened position in response to a level of detected motion, wherein the night light unit and the means for controlling light output from the night light are integrated into the switch.

28. The switch unit of claim 27, further comprises means for controlling the level of the light output from the night light with the switch in the opened position in response to a level of detected light.

* * * * *